(12) United States Patent
Ke et al.

(10) Patent No.: US 8,963,863 B2
(45) Date of Patent: Feb. 24, 2015

(54) COMPUTER, DISPLAY CARD, DISPLAY DEVICE AND METHOD FOR UPDATING DISPLAY INFORMATION

(75) Inventors: Haibin Ke, Beijing (CN); Zhongqing Li, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 202 days.

(21) Appl. No.: 13/634,286

(22) PCT Filed: Mar. 11, 2011

(86) PCT No.: PCT/CN2011/071713
§ 371 (c)(1),
(2), (4) Date: Sep. 12, 2012

(87) PCT Pub. No.: WO2011/110098
PCT Pub. Date: Sep. 15, 2011

(65) Prior Publication Data
US 2013/0002596 A1    Jan. 3, 2013

(30) Foreign Application Priority Data
Mar. 12, 2010   (CN) .......................... 2010 1 0124745

(51) Int. Cl.
*G06F 3/041* (2006.01)
*G06F 1/32* (2006.01)
*G06F 3/14* (2006.01)
*G09G 5/36* (2006.01)

(52) U.S. Cl.
CPC ................ *G06F 1/3203* (2013.01); *G06F 3/14* (2013.01); *G09G 5/363* (2013.01); *G09G 2330/022* (2013.01); *G09G 2340/12* (2013.01)
USPC .......................................... 345/173; 345/520

(58) Field of Classification Search
CPC ............. G09G 5/363; G09G 2330/021; G06F 1/3203; G06F 1/3287
See application file for complete search history.

(56) References Cited

U.S. PATENT DOCUMENTS

| | | | |
|---|---|---|---|
| 7,181,006 | B2 | 2/2007 | Shimazaki |
| 7,240,228 | B2 | 7/2007 | Bear et al. |

(Continued)

FOREIGN PATENT DOCUMENTS

| | | |
|---|---|---|
| CN | 1431846 | 7/2003 |
| CN | 1550951 | 12/2004 |
| CN | 101193392 | 6/2008 |

OTHER PUBLICATIONS

PCT/CN2011/071713 International Search Report dated Jun. 30, 2011 (2 pages).

(Continued)

*Primary Examiner* — Lixi C Simpson
(74) *Attorney, Agent, or Firm* — Brinks Gilson & Lione; G. Peter Nichols (57) ABSTRACT

A computer, a graphic card, a display apparatus and a method of updating information is described, wherein, the computer has a first status and a second status, and the system power consumption of computer in the first status is larger than the system power consumption of computer in the second status. The computer includes a graphic card having display memory and a display apparatus connected to the graphic card, and further includes an input processing module for acquiring input information when the computer is in the second status, and updating first display information stored in the display memory outputted to the display apparatus according to the input information to obtain second display information. The graphic card outputs the second display information to the display apparatus when the computer is in the second status.

9 Claims, 4 Drawing Sheets

(56) References Cited

U.S. PATENT DOCUMENTS

2003/0107600 A1* 6/2003 Kwong et al. ............... 345/764
2008/0132287 A1  6/2008 Choi
2010/0191947 A1* 7/2010 Shin ............................ 713/2
2011/0219252 A1* 9/2011 de Cesare et al. ........... 713/324

OTHER PUBLICATIONS

PCT/CN2011/071713 International Preliminary Report on Patentability dated Sep. 18, 2012 (6 pages).

* cited by examiner

PRIOR ART

COMPUTER, DISPLAY CARD, DISPLAY DEVICE AND METHOD FOR UPDATING DISPLAY INFORMATION

BACKGROUND

The present invention relates to the field of computer, and specially, relates to a computer a graphic card, a display apparatus and a method of updating display information.

Figure 1:
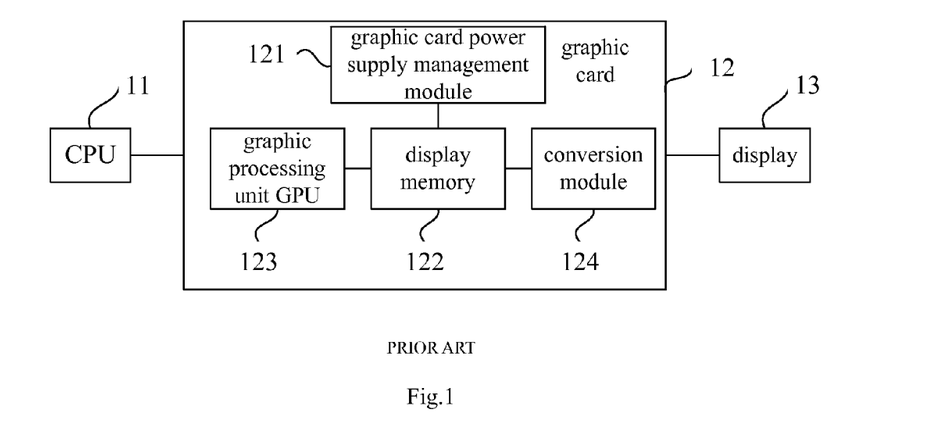
FIG. 1 is a diagram of connection relationship of the CPU, graphic card and display in the computer in the prior art.

As shown in FIG. 1, the computer comprises: a CPU (Central Process Unit) 11, a graphic card 12 and a display apparatus 13; in the prior art there is an energy saving technology that a graphic card power supply management module of the computer performs power supply management of respective functional modules of the graphic card. The graphic card 12 comprises: a graphic card power supply management module 121, a display memory 122, a graphic processing unit (GPU) 123 and a conversion module 124, etc., wherein, the graphic processing unit 123 is a graphic processing chip computing the data sent from the CPU to 2D or 3D picture and it is the core component of the graphic card. The data origin of the GPU is the CPU, if the CPU is in a sleep status, the GPU would not have data origin, and the GPU is in the sleep mode.

In the prior art there is an energy saving technology which makes the main functional module of the computer (such as CPU or the like) stay in the sleep mode (i.e., the electric saving mode), the graphic card power supply management module 121 can make the graphic processing unit 123 in the sleep status and the display memory 122 in a working status, the conversion module 124 is also in the working status, the display information in the display memory 122 is converted into an image by the conversion module 124, and outputted to the display screen of the display, thus even if the CPU or the like of the computer is in the sleep status, the display information in the display memory 122 can maintain the display screen of the computer displaying a kind of picture for a long time.

This energy saving technology is often applied in occasions such as conference, if a picture needs to be displayed on the projection screen for a long time, and at this time the computer being an apparatus for outputting the information, the respective functional modules (such as CPU or the like) of the computer do not need to be in working status, only the information in the display memory needs to be outputted to the display screen, that is, only the relevant functional module in the graphic card is maintained in the working status.

The applicant finds there are at least the following problems in the prior art during the procedure of implementing the embodiment of the application.

In the energy saving technology as shown in FIG. 1, the content on the display screen can only be displayed but not updated as both of the CPU and GPU are in sleep status, and if the content needs to be updated, the CPU would be woke up to further update the information of the display memory by the CPU, and output the update information to the display screen. For example when a schedule table is displayed on the display screen, the user can only view and can not update it directly. Updating the display information of the display screen can not be achieved when the computer is in the electric saving mode in the prior art.

SUMMARY

The technical problem intended to be solved by the embodiment of the application is to provide a computer, graphic card, display apparatus and method of updating display information, capable of updating the display interface of the display screen when the main system of the computer is in low power consumption mode.

In order to solve the above technical problem, the embodiments of the present invention provides a technical solution as follows:

In one aspect, there provides a computer having a first status and a second status, wherein, the system power consumption of computer in the first status is larger than the system power consumption of computer in the second status; the computer comprises a graphic card having a display memory and a display apparatus connected to the graphic card, and the computer further comprises:

An input processing module for acquiring input information when the computer is in the second status, and updating first display information stored in the display memory outputted to the display apparatus according to the input information to obtain second display information.

The graphic card outputs the second display information to the display apparatus when the computer is in the second status.

Preferably the is play apparatus has a touch screen, and the input processing module comprises:

An acquiring module for acquiring the input information inputted through the touch screen;

An updating module for storing the input information at a location in the display memory corresponding to the location of the input information on touch screen according to the definition of the display apparatus, and superimposing the input information and the original first display information in the display memory to obtain the second display information.

Preferably, the graphic card comprises:

A conversion module for converting the second display information in the display memory into an image signal and outputting to the display apparatus.

Preferably, the graphic card further comprises:

A graphic card power supply management module and a graphic processing unit;

The graphic card power supply management module is to control the graphic processing unit to be in non-powered status, and control the display memory, the conversion module and the input processing module to be in powered status when the computer is in the second status according to the control instruction issued by the CPU when the computer is in the first status.

The embodiment of the application further provides a graphic card applied to a computer having a first status and a second status, wherein, the system power consumption when the computer is in the first status is larger than the system power consumption when the computer is in the second status, the graphic card comprises a graphic processing unit and a display memory for storing display information, and the graphic card further comprises:

An input processing module for acquiring input information when the graphic processing unit is in a status corresponding to the second status of the computer, and updating the first display information stored in the display memory according to the input information to obtain the second display information;

A conversion module for converting the second display information to an image signal when the graphic processing unit is in a status corresponding to the second status of the computer and outputting the image signal to display it on the display apparatus of the computer.

The embodiment of the application further provides a display apparatus applied to the computer including a graphic card, the computer having a first status and a second status, wherein, the system power consumption when the computer is in the first status is larger than the system power consumption when the computer is in the second status, the display apparatus comprises a display screen, and the display apparatus further comprises:

An input processing module for acquiring input information when the computer is in the second status, and updating the first display information stored in the display memory of the graphic card to be outputted to the display screen according to the input information to obtain the second display information;

The graphic card converts the second display information to an image signal when the computer is in the second status, and outputs it to the display screen.

Preferably the display screen is a touch screen, and the input processing module comprises:

An acquiring module for acquiring the input information inputted through the touch screen;

An updating module for storing the input information at a location in the display memory corresponding to the location of the input information on the touch screen according to the definition of the display apparatus, and superimposing the input information and the original first display information in the display memory to obtain the second display information.

Preferably, the input processing module is powered by the power supply of the display apparatus through the power supply management module of the display apparatus.

The embodiment of the application further provides a method for updating the display information applied to a computing apparatus, the computing apparatus having a first status and a second status, wherein, the system power consumption when the computing apparatus is in the first status is larger than the system power consumption when the computing apparatus is in the second status, the computing apparatus comprises a graphic card including a display memory, which stores the first display information outputted to the display apparatus when the computing apparatus is in the second status, and the method comprises:

Acquiring input information;

Updating the first display information in the display memory according to the input information to obtain the second display information;

Outputting the second display information to the display apparatus.

Preferably the step of obtaining the input information is specifically:

Obtaining the input information inputted through the touch screen of the display apparatus of the computing apparatus.

Preferably the step of updating the first display information in the display memory according to the input information is specifically:

Storing the input information at a location in the display memory corresponding to the location of the input information on the touch screen according to the definition of the display apparatus, and superimposing the input information and the original first display information in the display memory to obtain the second display information.

The embodiments of the application have the following advantageous effect:

The above technical solution make the computer implement the update of the display interface of the display screen while in the second status as the energy saving status, by updating the display information in the display memory according to newly inputted input information by the input processing module when the computer is in the second status that is the main system of the computer in the electric saving mode (for example, CPU the memory and the hard disc are in the sleep status), to meet the practical need of the user.

DETAILED DESCRIPTION

In order to further clarify the technical problem to be solved, the technical solution and advantage of the embodiment of the application, the detailed embodiment will be described in connection with the accompanied drawings.

For the problem that the display screen of the display apparatus can only display but not update the content on the display screen when the main system of the computer is in the electric saving mode in the prior art, the embodiment of the application provides a computer graphic card, display apparatus and method of updating display information, capable of updating the display interface of the display screen.

Figure 2:
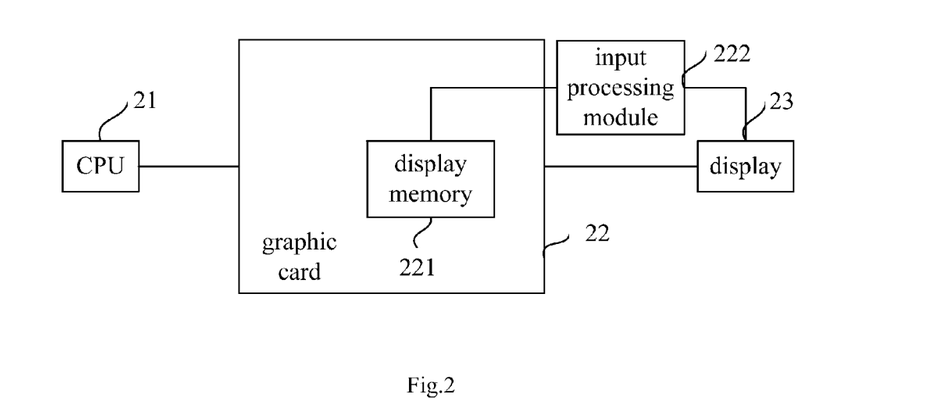
FIG. 2 is a schematic diagram of the computer of the embodiment of the application.

As shown in FIG. 2, the computer according to the embodiment of the application has a first status and a second status, wherein, the system power consumption of computer in the first status is larger than the system power consumption of computer in the second status for example, the first status can be the status that the power consumption module such as the CPU of the computer or the like is in the wake-up status, the second status can be the status that the main system of the computer is in the electric saving mode (CPU, memory, hard disc and the graphic card, etc. are in the sleep status); the computer comprises a graphic card 22 having a display memory 221 and a display apparatus 23 connected to the graphic card 22, and the computer further comprises:

An input processing module 222 for acquiring input information when the computer is in the second status, and updating first display information stored in the display memory 221 to be outputted to the display apparatus according to the input information to obtain second display information;

The graphic card 22 outputs the second display information to the display apparatus 23 when the computer is in the second status.

In the embodiment, the computer can comprise the main power consumption components such as CPU (central processing unit) 21, etc., by updating the display information in the display memory according to the current input information by the input processing module when the computer is in the electric saving mode (for example, the CPU the memory, the hard disc and the GPU of the graphic card are all in the sleep status), the computer is made to implement the update of the display information of the display apparatus while maintaining electric saving, to meet the practical need of the user.

Figure 3:
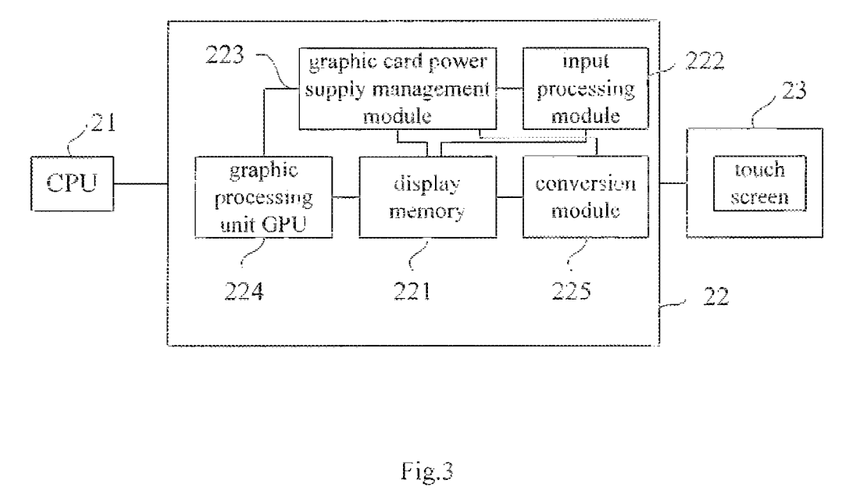
FIG. 3 is a schematic diagram of the specific structure of the computer as shown in FIG. 2.

As shown in FIG. 3, on a basis of the embodiment as shown in the FIG. 2, the above display apparatus has a touch screen, and the input processing module 222 comprises:

An acquiring module for acquiring the input information inputted through the touch screen;

An updating module or storing she input information at a location in the display memory corresponding to the location of the input information on touch screen according to the definition of the display apparatus, and superimposing the input information and the original first display information in the display memory to obtain the second display information.

Wherein, the display apparatus is specifically the display of the computer, that is, the display updates the received input information to the corresponding location of the display memory corresponding to the location of the input information on touch screen according to the definition of the current display, and superimposes the input information and the original first display information in the display memory to obtain the second display information.

For example, the definition of the display is 800*1200, the current input information is a line drawn at the $20^{th}$ pixel row and the first to the $20^{th}$ pixel columns of the touch screen of the display of the computers then, the line would be updated to the corresponding location of the display memory corresponding to the location of the line on the touch screen i.e., the $20^{th}$ pixel row and the first to the $20^{th}$ pixel columns), the line is superimposed with the original first display information in the display memory to obtain the updated second display information.

Preferably in the above embodiment, the graphic card comprises:

A conversion module 225 for converting she updated second display information in the display memory to an image signal, and outputting it to the display apparatus; for example, the second display information of the above superimposed newly inputted line and the original first display information is converted into an image signal, and outputted to the display screen, then thr display interface added with a line would be displayed on the display screen on a basis of the original display interface.

Preferably in the above embodiment, the input processing module 222 can be in the graphic card 22, and the graphic card 22 further comprises:

A graphic card power supply management module 223 and a graphic processing unit 224;

Wherein, the graphic card power supply management module 223 is connected to the graphic processing unit 224, the display memory 221, the conversion module 225 and the input processing module 222, respectively, for controlling the graphic processing unit 224 to be in non-powered status and controlling the display memory 221, the conversion module 225 and the input processing module 222 to be in powered status when the computer is in the second status according so the control instruction issued by the CPU when the computer is in the first status;

Thus, the updated second display information in the display memory can be outputted to the display screen when the graphic processing unit 224 sleeps, the CPU or the like of the computer and the graphic processing unit 224 of the graphic card do not need to wake up when the new input information is inputted through the touch screen by the user. The input processing module 222 can implement the update of the display information on the display screen of the display, so that the update of the display information on the display screen of the display is implemented while the energy saving is achieved.

Here, the conversion module 225 can be a D/A conversion module or a D/D conversion module; wherein, when the display is an analog display, the updated display information in the display memory is converted into the image signal using the D/A conversion module; and if the display is a digital display, the updated display information in the display memory is converted into the digital image signal using the D/D conversion module, and is outputted to the display screen of the display for display.

In general the control instruction of the CPU can be driven by the graphic card, can be issued before the CPU turns to the sleep status (i.e., issued before the computer is in the second status), the control instruction makes the graphic card be in the electric saving mode in the CPU sleep status (when the computer is in the second status with low power consumption, the electric saving mode of the graphic card means that one or more of the functional modules in the graphic card are in the non-powered status, especially the graphic processing unit (GPU) is in the non-powered status; the graphic card power supply management module 223 makes the display memory 221, the conversion module and the input processing module 222 be in the powered status when the graphic processing unit 224 is in the non-powered status according to the control instruction, so as to implement the update of the display information on the display interface of the display in the sleep status of the computer system, and the update of the display interface of the display implemented while the energy saving of the computer is maintained.

Certainly the input processing module 222 can also be the separate processor chip outside the graphic card 22 installed on the main board of the computer directly, but the powered status of the input processing module 222 needs to be managed by the graphic card power supply management module 223, that is, the operation of the input processing module 222 may not depend on the main system of the computer (such as CPU, memory and hard disc, etc.)

Thus, even if the module of CPU or the like is in the sleep mode, the input processing module 222 can cooperate with the graphic card 22 to implement the update of the display information of the display, so as to add the function of updating the displa information of the display while the energy saving is achieved.

Figure 5:
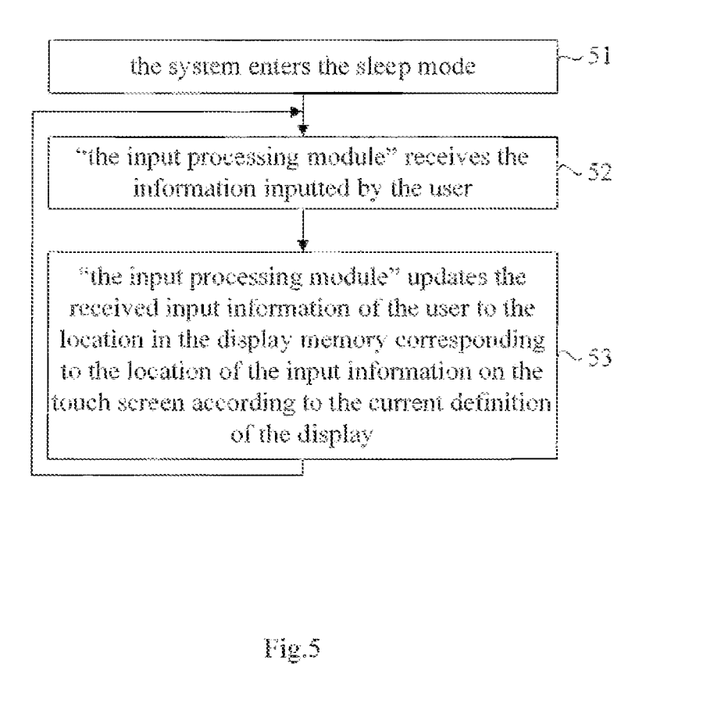
FIG. 5 is a flowchart of the first embodiment of the method of updating the display information of the application.

The specific application of the above computer will be described specifically in connection with FIGS. 5-7 as follows:

In the application scene of the embodiment of the application, the computer system is in the electric saving mode, only part of the hardware modules of the graphic card is powered on, the CPU can not update the content of the display memory in the graphic card at this time, in particular:

As shown in FIG. 5, it comprises:

Step 51: the computer system enters the electric saving mode, i.e., is in the energy saving mode;

Step 52: the input processing module 222 captures the input information on the touch screen by the user at this time, CPU does not need to be waked up from the sleep mode to process this input, and process it through the input processing module 222, just like the display memory 221, the input processing module 222 is controlled to be in powered status by the graphic card power supply management module 223;

Step 53: the input processing module 222 updates the received input information of the user to the corresponding location in the display memory 221 according to the current definition of the display, the corresponding location means the location corresponding to the location of the input information on the touch screen; the CPU does not need to intervene at this time, and the input processing module 222 can implement the update of the display information on the display screen.

Figure 6:
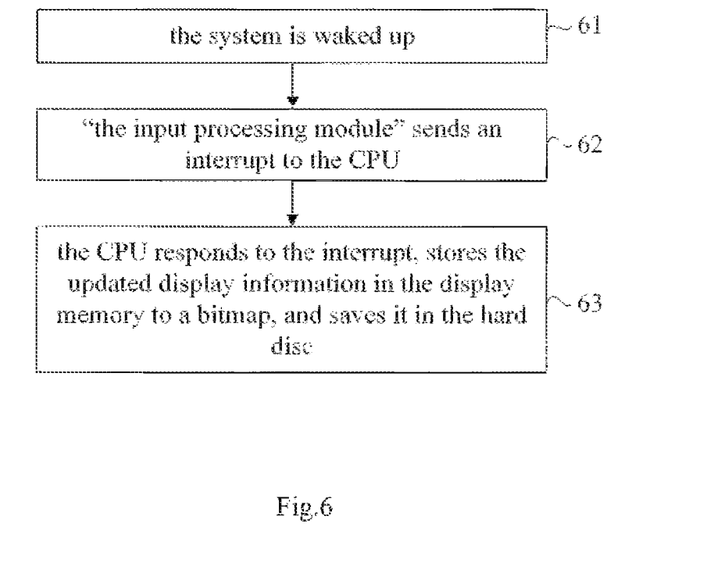
FIG. 6 is a flowchart of the second embodiment of the method of updating the display information of the application.

As shown in FIG. 6, if the system is waked up after the display information in the display memory 221 is updated, the process comprises:

Step 61: the computer system is waked up;

Step 62: the input processing module 222 sends an interrupt to the CPU; certainly, the CPU can inquire the input processing module 222 actively or detect the display memory 221 so determine whether the display memory 221 is updated;

Step 63: In response to the interrupt, the CPU acquires the updated display information from the display memory 221, stores the updated display information as a bitmap, and saves the bitmap in the hard disc of the computer so as to implement a permanent update; certainly, it may not be stored as a bitmap but the updated display information in the display memory 221 is converted into a message in text format, and the message in text format is saved.

Figure 7:
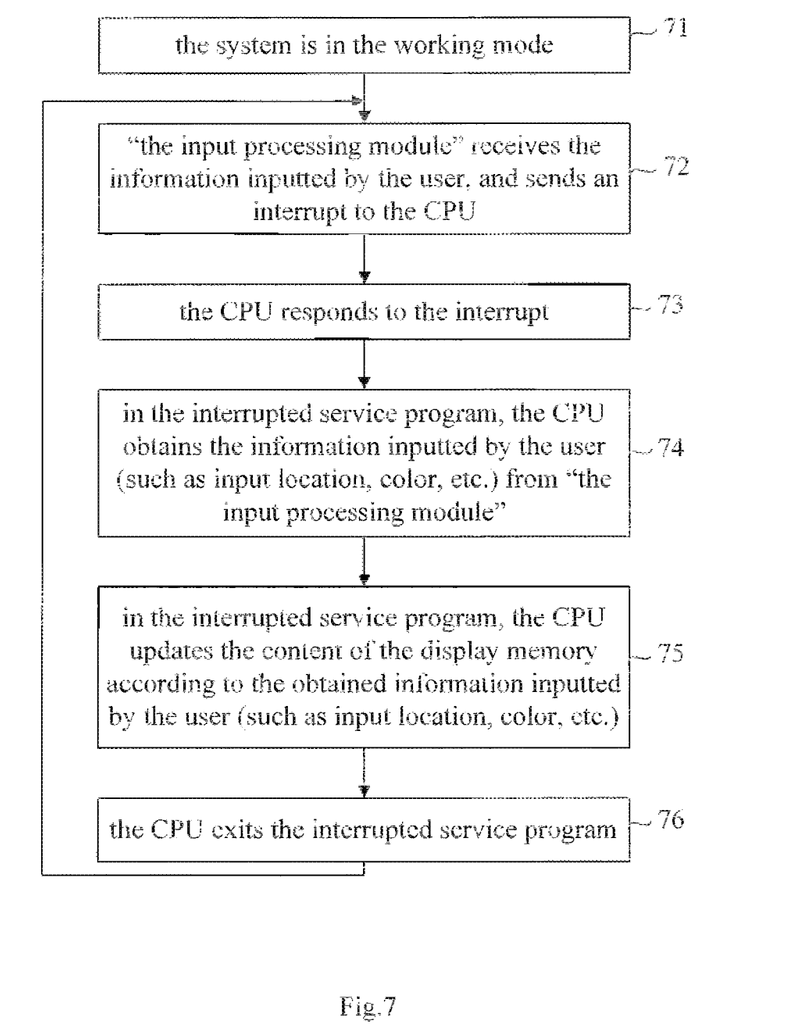
FIG. 7 is a flowchart of the third embodiment of the method of updating the display information of the application.

As shown in FIG. 7 the above computer of the application comprises when it is in the normal working status (e.g. the above first status):

Step 71: the system is in the working status; at this time, the CPU can perform operation on the display memory, if there is input on the touch screen by the user, it is implemented by the cooperation of the input processing module 222 and the CPU;

Step 72: the input processing module 222 receives the input information of the user; and send an interrupt to the CPU; certainly, the CPU can inquire the input processing module 222 actively or detect the display memory 221 to determine whether the display memory 221 is updated;

Step 73: the CPU responds to the interrupt;

Step 74: the CPU acquires the updated display information (such as input location, color, etc.) in the interrupted service program;

Step 75: the CPU updates the content in the display memory 221 according to the acquired input information of the user (such as input location, color, etc.), stores the updated display information in the display memory 221 as a bitmap, and saves the bitmap in the hard disc of the computer; certainly it may not be stored as a bitmap, but the updated display information in the display memory 221 is converted into a message in text format, and the message in text format is saved;

Step 76: the CPU exits the interrupted service program.

In summary, the technical solution of the embodiment of the application does not need to wake up the computer system, and can update the display information on the screen through the input processing module 222, so that if the user needs to update the schedule, he can write on the screen directly as writing on a paper sheet with a pen; and the sleep of the system is not interrupted, then a more effective energy saving can be achieved; the input processing module can also cooperate with the CPU to implement the update of the display information when the computer system is in a normal working status, and the entire performance of the computer is not influenced.

Figure 4:
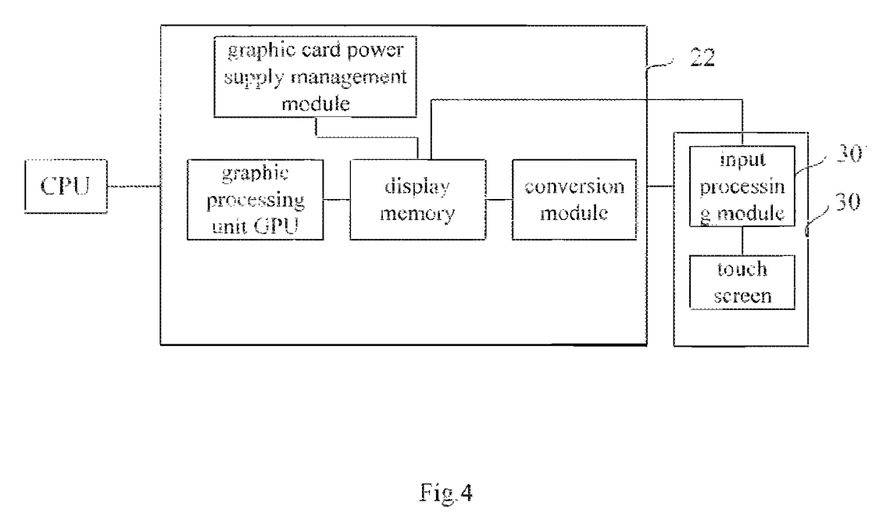
FIG. 4 is a schematic diagram of structure of the display apparatus of the embodiment of the application.

As shown in FIG. 4, the embodiment of the application further provides a display apparatus 30 applied to a computer having a graphic card 22, the computer having a first status and a second status, wherein, the system power consumption when the computer is in the first status is larger than the system power consumption when the computer is in the second status; the display apparatus 30 comprises a display screen, and the display apparatus further comprises:

An input processing module 301 for acquiring input information when the computer is in the second status, and updating the first display information sod in the display memory to be outputted to the display screen according to the input information to obtain the second display information;

The graphic card 22 converts the second, display information into an image signal when the computer is in the second status, and outputs it to the display screen.

Wherein, the display screen is specifically a display, the input processing module 301 for implementing the update of the display information of the display is integrated in the display the input processing module 301 is connected with the power supply management module of the display, the input processing module 301 is powered by the power supply of the display through the power supply management module of the display, the display can implement the update and display independently when the main system of the computer is in electric saving mode, and the update of the display information of the display can be implemented while the energy saving is achieved, so as to meet the practical need of the user.

Preferably, the display screen of the display apparatus 30 is a touch screen, and the input processing module 301 comprises:

An acquiring module for acquiring the current input information inputted through the touch screen;

An updating module for storing the current input information at a location in the display memory corresponding to the location of the current input information on the touch screen according to the definition of the display apparatus 30, and superimposing the current input information and the original first display information in the display memory so obtain the second display information.

In the embodiment of the display, the input processing module 301 can be a separate processing chip, and integrated in the display, the display can be a smart display, and used together with the host system of the computer, or used separately.

When the display is used together with the host system of the computer, as the host system of the computer being in the electric saving mode, such as the CPU or the like being in the sleep status, when there is new input information on the touch screen of the display, the host system module does not need to be waked up, the update of the display information on the display interface of the display can be implemented by the input processing module 301, the detailed implementing method is the same as that shown in the above embodiment of FIGS. 2 and 3, the update of the display information on the display interface of the display can also be implemented while the energy saving is achieved, so as to meet the practical need of the user.

The embodiment of the application further provides a method for updating the display information applied to a computing apparatus, the computing apparatus having a first status and a second status, wherein, the system power consumption when the computing apparatus in the first status is larger than the system power consumption when the computing apparatus is in the second status; the computing apparatus comprises a graphic card having a display memory, which stores the first display information outputted to the display apparatus when the computing apparatus is in the second status, and the method comprises:

Step 71, acquiring the input information when the computing apparatus is in the electric saving mode; wherein, the electric saving mode of the computer means the main system of the computer is in the electric saving mode, for example, the main functional module such as CPU or the like is in the sleep status, at the same time the graphic processing unit GPU of the graphic card can also be in the sleep status; the current input information is acquired by another input processing module;

Step 72, updating the original first display information in the display memory according to the input information to obtain the updated second display information;

Step 73, outputting the updated second display information to the display apparatus of the computing apparatus.

In the method, by updating the display information in the display memory and as the update of the display information in the display memory does not depend on the main system of the computer (such as CPU), the update of the display information on the display interface of the display can be implemented when the computer system is in the sleep status, that is, the update of the display information of the display can be implemented while the energy saving of the computer can be maintained.

In particular, the above step 71 is specifically:

Obtaining the current input information inputted through the touch screen of the display apparatus of the computing apparatus.

The above step 73 is specifically: storing the input information at a location in the display memory corresponding to the location of the input information on the touch screen according to the definition of the display apparatus, and superimposing the input information and the original first display information in the display memory to obtain the updated second display information.

Certainly, after the above step 73, there can also comprises:

Step 74, when the computer system is waked up, an interrupt is sent to the CPU, in response to the interrupt, the CPU acquires the updated display information from the display memory, stores the updated display information as a bitmap, and saves the bitmap in the hard disc of the computer so as to implement a permanent update.

In the method, it also does not need to wake up the computer system when the display information of the display interface of the display is updated by updating the display information in the display memory through the input processing module, so as to implement the update of the display information on the screen if the user needs to update the schedule, he can write on the screen directly as writing on a paper sheet with a pen; and the sleep of the system is not interrupted, a more effective energy saving can be achieved.

The embodiment of the application further provides a graphic card applied to a computer having a first status and a second status, wherein, the system power consumption when the computer is in the first status is larger than the system power consumption when the computer is in the second status, the graphic card comprises a graphic processing unit and a display memory storing a display information, and the graphic card further comprises: an input processing module for acquiring input information when the graphic processing unit is in a status corresponding to the second status of the computer, and updating the first display information stored in the display memory according to the input information to obtain the second display information;

A conversion module for converting the updated second display information into an image signal when the graphic processing unit is in a status corresponding so the second status of the computer, and outputting it to the display apparatus of the computer for display.

In the embodiment, the input processing module comprises specifically: an acquiring module for acquiring the current input information inputted through the touch screen;

an updating module for storing the input information at a location in the display memory corresponding to the location of the input information on the touch screen according to the definition of the display apparatus, and superimposing the input information and the original first display information in the display memory to obtain the updated second display information.

The graphic card can further comprises: a graphic card power supply management module and a graphic processing unit; the graphic card power supply management module is for controlling the graphic processing unit to be in non-powered status, and controlling the display memory, the conversion module and the input processing module to be in powered status when the computer is in the second status according to the control instruction issued by the CPU when the computer is in the first status. The update of the display interface is implemented while the computer is maintained in the low power consumption status, to meet the need of the user.

The embodiment of the graphic card also does not need to wake up the computer system when the display information of the display interface of the display is updated, and by updating the display information in the display memory by the input processing module, the update of the display information on the screen is implemented.

When the above computer is in the second status with less system power consumption, for example, if a copy of a document is opened, and a certain page of content therein is discussed and stated or a long time, it can further control to close a certain component in powered status in the graphic card which is in the second status of the above computer. That is, in case that the content displayed on the display screen does not need to be updated, the computer, graphic card, display apparatus and method of displaying information can be further optimized.

In accordance with another embodiment of the application, it further provides a computer comprising: a graphic card having a graphic processing unit and a display memory which is for receiving data to be displayed, processing the data to be displayed and outputting the processed data to be displayed to display on the display apparatus; a graphic card power supply management module for managing a powered status of the graphic processing unit and the display memory; a central processing unit CPU for making the graphic processing unit be in non-powered status and making the display memory to be in powered-status with the graphic card power supply management module controlling the graphic card to enter electric saving mode when a predetermine condition is met.

In the computing in accordance with another embodiment of the application, with the separate control of the powered status of the graphic processing unit and the display memory in the graphic card, even if the graphic processing unit is in non-powered status, since the display memory is still in powered status, the display memory can still save the image data of the page being displayed currently, which is still displayed by the display apparatus, and since the graphic card enters the electric saving mode, the power consumption is lowered in the application scene of displaying one page for a long time.

Schematically, the above graphic card power supply management module can be provided on the graphic card as part of the graphic card, and can be provided outside the graphic card, for example, provided in the embedded controller (EC).

Preferably, in the computer, the CPU is further for controlling the other component than the graphic card in the computer to enter the electric saving mode after the graphic card enters the electric saving mode. Preferably, the CPU itself enters the electric saving mode after the graphic card enters the electric saving mode. Schematically, another embodiment of the application enters the electric saving mode according to the ACPI specification.

Preferably the above predetermined condition comprises at least one of the following conditions: receiving the trigger instruction issued by the user; and detecting that the display time length of the page being displayed is longer than a predetermined first time length. The predetermined first time length can be set arbitrarily by the user in advance, and it can be a default time length of the computer.

Schematically, the trigger instruction issued by the user can be implemented by a short-cut key. The short-cut key can be implemented as a hard key or a soft key. The CPU controls the display memory to enter the electric saving mode by using the graphic card power supply management module after receiving the instruction issued by the user pressing the short-cut key, so that the graphic processing unit is in the non-powered status and the display memory is in the powered status.

In another embodiment of the application, the display apparatus can be an analog signal display, such as VGA, and it can be a digital signal display such as a crystal display of digital visual interface (DVI) or high definition multimedia (HDMI). Schematically, when the display apparatus is an analog signal display, a D/A conversion module is included in the graphic card for converting the image signal outputted by the display memory into an analog signal and then outputting it to the display for display. When the display apparatus is a digital signal display, a D/D conversion module is included in the graphic card for converting the image signal outputted by the display memory into a signal in the format supported by the display apparatus and outputting it to the display apparatus for display.

For example, as shown in FIG. 1, in the computer in accordance with another embodiment of the application, the graphic card 12 comprises the graphic card power supply management module 121, the graphic processing unit (GPU) 123, the display memory 122 and the conversion module 124; the graphic card power supply management module 121 can separately control the power supply of the graphic processing unit 123, the display memory 122 and the conversion module 124 according to the instruction of the CPU 11. In the display method of the embodiment, the CPU manages the graphic card, notifies the graphic card power supply management module of the graphic card of setting the graphic card to enter the electric saving mode, makes the graphic processing unit be in the non-powered status, and makes the display memory and the conversion module be in the powered status when a predetermined condition is met, for example, when the shot-cut key for entering the electric saving mode is pressed by the user.

In the other embodiments of the applicant, it can be notifying the graphic card power supply management module of the graphic card of setting the graphic card to enter the electric saving mode, making the graphic processing unit be in the non-powered status, and making the display memory and the conversion module be in the powered status when the CPU detects that the user is currently in an application scene of displaying a page for a long time, schematically, when it is detected that the display time length of the page being displayed is longer than the predetermined first time length.

Thus, even the graphic processing unit does not work, since the display memory and the conversion module are still in working status, the display memory will maintain the currently stored data to be displayed, and it is converted into the analog signal supported by the display by the conversion module, the output is still sent to the display for display regularly, so as to implement the display of the page corresponding to the data to be displayed in the display memory on the display apparatus for a long time when the GPU does not work even if the CPU and other components of the computer are in the electric saving mode, and the power consumption is low.

Schematically, in the example, the CPU makes all of the other components other than the display memory, the conversion module and the display apparatus in the computer to enter the electric saving mode.

The CPU and the graphic processing unit being in the electric saving mode are waked up when a predetermined wake-up condition is met, schematically, the CPU and the graphic processing unit being in the electric saving mode can be waked up by pressing the above short-cut key again, in particular, the power of the graphic processing unit GPU is resumed by the graphic card power supply management module after the CPU resuming the normal working mode when the predetermined wake-up condition is met.

In the example, the graphic card power supply management module is provided on the graphic card. In other embodiments of the application the graphic card power supply management module can be provided outside the graphic card but not provided in the graphic card.

In the computer in accordance with another embodiment of the application, the display can also be a digital display supporting a digital signal. For the case of the display being the digital signal display, the above conversion module 124 can be a D/D conversion module. When the graphic processing unit and the CPU are both in the electric saving mode, there still maintains the image data of the page being displayed currently in the display memory, and the image data is send to the DID conversion module regularly, after being converted into a display signal format supported by the display apparatus such as DVI or HDMI format, it is send to the display apparatus for display. Also, the graphic card power supply management module is not limited to be provided on the graphic card, with no more comment here.

In the computer in accordance with another embodiment of the application, the computer comprises a host and a display; the host comprises a graphic card having a display memory, which is for receiving data to be displayed, processing the data to be displayed, saving the processed data to be displayed in the display memory and outputting the data from the display memory to the display apparatus when it is necessary to display it on the display screen; and a central processing unit for outputting the data to be displayed in the display memory to the buffer of the display apparatus and controlling the graphic card to enter the electric saving mode when a predetermined condition is met; the display comprises a buffer for storing the data to be displayed outputted from the host; and a display screen for displaying the data to be displayed stored in the display memory after the graphic card enters the electric saving mode.

Preferably, in other embodiments of the applicant, it can also be that the display apparatus acquires the above data to be displayed from the display memory actively when the host meets a predetermined condition.

Preferably, the above predetermined condition comprises at least one of the following conditions: receiving the trigger instruction issued by the user; and detecting that the day lay time length of the page being displayed is longer than a predetermined first time length. Preferably, in the computer of the embodiment, the other components including the CPU of the host can enter the electric saving mode in addition to the graphic card, the display apparatus can still maintain the display of the page by displaying the data to be displayed in the buffer, so that the power consumption is lowered significantly.

Preferably in the computer of the embodiment, a conversion module (the first conversion module) is provided in the graphic card, for converting the data to be displayed in the display memory into the digital signal supported by the display apparatus.

Preferably, in the computer of the embodiment, a conversion module (the second conversion module) is provided the display apparatus, for converting the data to be displayed in the buffer into the digital signal supported by the display apparatus.

In the embodiment of the application, the display apparatus can be an analog signal display such as VGA and can be a digital signal display such as a crystal display of DVI or HDMI interface. In the structure of the computer in another embodiment of the application, the display is an analog display supporting an analog signal. When the display is an analog signal display, a D/A conversion module (the first D/A conversion module) is included in the graphic card, for converting the image signal outputted from the display memory into the analog signal, and outputting to the display for display. The conversion module included in the display is a D/A conversion module (the second D/A conversion module), for converting the data to be displayed in the buffer to an analog signal and displaying on the display screen when the data to be displayed in the buffer needs to be displayed. In the example, the graphic card further comprises: a graphic processing unit for outputting the data to be displayed to the display memory in normal working mode. Schematically, in the computer of the embodiment of the application, the central processing unit CPU makes the graphic card be in the electric saving mode by disconnecting the power supply of the graphic card. In the specific implementation, the CPU can disconnect the power supply of the graphic card by controlling the graphic card power supply management module. In the example, the power supplies of the respective modules in the graphic card (including the graphic processing unit, the display memory and the first D/A conversion module) are all disconnected.

In the structure of the computer in another embodiment of the application, the display apparatus is a digital display supporting the digital signal. When the display apparatus is a digital display, the graphic card comprises a D/D conversion module (the first D/D conversion module), for converting the image signal outputted from the display memory into the signal format supported by the display apparatus, and outputting it to the display apparatus for display. The conversion module included in the display apparatus is a D/D conversion module (the second D/D conversion module), for converting the data to be displayed in the buffer into the digital signal format supported by the display apparatus and displaying it on the display screen when the data to be displayed in the buffer needs to be displayed in the example, the graphic card further comprises a graphic processing unit for outputting the data to be displayed to the display memory in normal working mode. Schematically, the above graphic processing unit is a graphic processing chip.

In the computer of the embodiment of the application, by providing the buffer in the display apparatus, when the predetermined condition is met (receiving the trigger instruction issued by the user; or detecting that the display time length of the page being displayed is longer than a predetermined first time length), the data to be displayed outputted from the display memory of the graphic card is stored in the buffer, and the graphic card is controlled to be in the electric saving mode after the data to be displayed is outputted to the buffer of the display. Schematically, the above trigger instruction can be the user pressing the predetermined short-cut key including hard key or soft key. Schematically, the electric saving mode is controlling the entire graphic card to be in the non-powered status. The CPU makes the graphic card be in electric saving mode by disconnecting the power supply of the graphic card. Thus, even after the graphic card is in the electric saving mode, the display apparatus can still maintain the current display picture through the data to be displayed in the buffer of the display, since the graphic card is in the electric saving mode, the technical solution in accordance with another embodiment of the application can implement the display of a page for a long time with low power consumption, and the power consumption in the application scene of displaying one page for a long time is lowered significantly.

Another embodiment of the application is implemented by providing a buffer area in the display apparatus, inputting the image data currently stored in the display memory to the buffer area to save it before the computer system (excluding the display apparatus) enters the electric saving mode and displaying the image data in the buffer after the computer system (excluding the display apparatus) enters the electric saving mode.

Preferably, after the data to be displayed in the display memory is outputted to the buffer of the display apparatus, all of the other components other than the display apparatus of the entire computer can enter the electric saving mode.

Preferably, when a predetermined wake-up condition is met, the CPU and the graphic card being in the electric saving mode are waked up, schematically, the CPU and the graphic card being in the electric saving mode can be waked up by pressing the above short-cut key again, in particular, after the CPU resumes the normal working status when the predetermined wake up condition is met, the power of the entire graphic card is resumed through the graphic card power supply management module.

Schematically but not limited, when the graphic card is in a normal status, the data outputted to the display apparatus for display is the data format converted by the conversion module and displayed by the display apparatus directly; when the graphic card in the embodiment is in the electric saving mode, the data outputted to the buffer is the signal format before the conversion of the conversion module, the data is converted by the conversion module in the display apparatus for display after being outputted to the buffer of the display apparatus. In another embodiment of the application, the CPU output the data to be displayed in the display memory to the display memory of the display through a predetermined data interface. Schematically, the predetermined data interface is $I^2C$ interface. When the predetermined data interface and the graphic card are both in the normal working status, the interface via which the display memory outputs the data to be displayed to the display apparatus is different.

Another embodiment of the application further discloses a display apparatus, the display apparatus is connected to a host including a graphic card, which is characterized in comprising: a buffer for storing the data to be displayed of the host acquired from the display memory of the graphic card when the host meets a predetermined condition; and a display screen for displaying the data to be displayed stored in the buffer.

Schematically, the data to be displayed stored in the above buffer can be the data outputted from the display memory to the buffer by the CPU of the host when the host meets the predetermined condition, or the data taken from the display memory by the display apparatus and stored in the buffer.

Preferably, the display apparatus further comprises: a conversion module for converting the data to be displayed stored in the buffer to the digital data supported by the display apparatus; and the display screen further displays the data to be displayed according to the converted digital signal. Schematically, according to the difference of the display apparatus, the above conversion module is a D/A conversion module or a DID conversion module.

Preferably, in the display apparatus, the data to be displayed stored in the buffer is the data to be displayed obtained from the display memory of the graphic card before the graphic card enters the electric saving mode.

Preferably, the above predetermined condition is at least one of the following conditions: receiving the trigger instruction issued by the user; and detecting that the display time length of the page being displayed is longer than a predetermined first time length.

Another embodiment of the application further discloses a method of displaying information of a computer, the computer comprises a host and a display apparatus, the computer comprises a graphic card having a graphic processing unit and a display memory, a graphic card power supply management module and a central processing unit, and the method of displaying information comprises the step of:

The CPU controlling the graphic card to enter the electric saving mode through the graphic card power supply management module, to make the graphic processing unit be in non-powered status and make the display memory be in powered status.

The method of displaying information of another embodiment of the application further comprises: the step of waking up the graphic card being in the electric saving mode when a predetermined wake-up condition is met.

In accordance with the method of displaying information of another embodiment of the application, there comprises after the graphic card entering the electric saving mode: the CPU and/or the other component than the graphic card of the computer enters the electric saving mode.

Preferably, the above predetermined condition comprises at least one of the following conditions: receiving the trigger instruction issued by the user; and detecting that the display time length of the page being displayed is longer than a predetermined first time length.

In the method of displaying information of another embodiment of the application, the computer comprises a host and a display apparatus, the host comprises a graphic card having a display memory and a central processing unit CPU, wherein, the display apparatus comprises a buffer and a display screen, and the method of displaying information comprises the step of:

When a predetermined condition is met, outputting the data to be displayed stored in the display memory to the buffer of the display apparatus, and controlling the graphic card to enter the electric saving mode;

The display apparatus displaying the data to be displayed stored in the buffer on the display screen.

Preferably, in the method of displaying information of another embodiment of the application, before the display apparatus displays the data to be displayed stored in the buffer on the display screen, it further comprises: converting the data to be displayed stored in the buffer into the display data supported by the display apparatus.

Preferably, the data to be displayed stored in the buffer of the display apparatus is the data outputted from the display memory directly. Schematically, when the display apparatus is an analog display, before the display apparatus displays the data to be displayed stored in the buffer on the display screen, it further comprises: converting the data to be displayed stored in the buffer into the analog data supported by the display apparatus; when the display apparatus is a digital display, before the display apparatus displays the data to be displayed stored in the buffer on the display screen, it further comprises: converting the data to be displayed stored in the buffer into the digital signal format supported by the display apparatus.

Preferably, when the display apparatus judges that it does not receive the display signal by the graphic card in a normal manner, the data is read from the buffer and converted to be displayed. Schematically, when the display apparatus judges that a signal can be displayed directly outputted from the graphic card, the data is read from the buffer and converted to display.

In the method of displaying information of another embodiment of the application, after the graphic card enters the electric saving mode, there further comprises: the CPU and/or the other component other than the graphic card of the computer enter(s) the electric saving mode.

The method of displaying information of another embodiment of the application further comprises: waking up the graphic card being in the electric saving mode when the predetermined wake-up condition is met.

Preferably, the above predetermined condition comprises at least one of the following conditions: receiving the trigger instruction issued by the user; and detecting that the display time length of the page being displayed is longer than a predetermined first time length.

With the method of displaying information of another embodiment of the application, in the application scene that the user opens a copy of document such as PPT document and discusses and states the content of a certain page therein for a long time, the power consumption can be lowered significantly.

That is, in the computer, graphic card, display apparatus and method of displaying information in accordance with another embodiment of the application, since the content displayed on the display screen does not need to be updated, the input processing module can be further closed in the second status of the computer so as to make the graphic card be in a status with more electric saving. At this time, only the display memory of the graphic card and the necessary component for displaying the image signal in the display memory on the display screen needs to be opened, and those skilled in the art can understand, the embodiment of the application does not mind any limit to it.

The above-mentioned is only the preferred implementations for carrying out the invention. It should be pointed out that, for those ordinarily skilled in the art, on the condition of not deviating from the principle mentioned in the present invention, several improvements and refinements can be made as well, which should be also treated as the scope protected by the present invention.

What is claimed is:
1. A computer having a first status and a second status, wherein, a system power consumption of the computer in the first status is larger than a system power consumption of the computer in the second status, and the computer comprises a graphic card having a display memory and a display apparatus connected to the graphic card, the computer further comprising:
   an input processing module for acquiring input information when the computer is in the second status, and updating first display information stored in the display memory outputted to the display apparatus according to the input information to obtain second display information;

the graphic card outputting the second display information to the display apparatus when the computer is in the second status;

wherein the graphic card comprises a conversion module for converting the second display information in the display memory into an image signal, and outputting it to the display apparatus;

a graphic card power supply management module and a graphic processing unit; and, wherein the graphic card power supply management module controls the graphic processing unit to be in a non-powered status, and controls the display memory, the conversion module, and the input processing module to be in a powered status when the computer is in the second status according to a control instruction issued by a computer processing unit when the computer is in the first state.

2. The computer according to claim 1, wherein, the display apparatus has a touch screen, and the input processing module comprises:

an acquiring module for acquiring the input information inputted through the touch screen;

an updating module for storing the input information at a location stored in the display memory corresponding to the location of the input information on touch screen according to the definition of the display apparatus, and superimposing the input information and the original first display information in the display memory to obtain the second display information.

3. A graphic card applied to a computer having a first status and a second status, wherein, a system power consumption when the computer is in the first status is larger than a system power consumption when the computer is in the second status, and the graphic card comprises a graphic processing unit and a display memory storing display information, the graphic card further comprising:

an input processing module for acquiring input information when the graphic processing unit is in a status corresponding to the second status of the computer, and updating the first display information stored in the display memory according to the input information to obtain the second display information;

a conversion module for converting the second display information into an image signal when the graphic processing unit is in a status corresponding to the second status of the computer, and outputting to a display on the display apparatus of the computer;

a graphic card power supply management module and a graphic processing unit; and, the graphic card power supply management module is for controlling the graphic processing unit to be in a non-powered status, and controlling the display memory, the conversion module, and the input processing module to be in a powered status when the computer is in the second status according to a control instruction issued by a computer processing unit when the computer is in the first state.

4. A display apparatus applied to the computer including a graphic card, the computer having a first status and a second status, wherein, a system power consumption when the computer is in the first status is larger than a system power consumption when the computer is in the second status, and the display apparatus comprises a display screen, the display apparatus further comprising:

an input processing module for acquiring input information when the computer is in the second status, and updating the first display information stored in the display memory of the graphic card outputted to the display screen according to the input information to obtain the second display information;

the graphic card comprises:

a conversion module to convert the second display information into an image signal when the computer is in the second status, and outputting it to the display screen;

a graphic card power supply management module and a graphic processing unit; and, the graphic card power supply management module is for controlling the graphic processing unit to be in a non-powered status, and controlling the display memory, the conversion module, and the input processing module to be in a powered status when the computer is in the second status according to a control instruction issued by a computer processing unit when the computer is in the first state.

5. The display apparatus according to claim 4, wherein the display screen is a touch screen, and the input processing module comprises:

an acquiring module for acquiring the input information inputted through the touch screen;

an updating module for storing the input information at a location in the display memory corresponding to the location of the input information on the touch screen according to the definition of the display apparatus, and superimposing the input information and the original first display information in the display memory to obtain the second display information.

6. The display apparatus according to claim 5, wherein, the input processing module is powered by a power supply of the display apparatus through the power supply management module of the display apparatus.

7. A method for updating the display information applied to a computing apparatus, the computing apparatus having a first status and a second status, wherein, a system power consumption when the computing apparatus is in the first status is larger than a system power consumption when the computing apparatus is in the second status, the computing apparatus comprises a graphic card including a display memory, and the display memory stores the first display information outputted to the display apparatus when the computing apparatus is in the second status, the method comprising:

acquiring the input information;

updating the first display information in the display memory according to the input information to obtain the second display information;

outputting the second display information to the display apparatus;

wherein the graphic card comprises:

a conversion module for converting the second display information in the display memory into an image signal and outputting it to the display apparatus;

the method further comprising controlling by the controlling, by the graphic power supply management module, the graphic processing unit to be in a non-powered status, and the display memory, the conversion module, and the input processing module to be in a powered status when the computer is in the second status according to a control instruction issued by a central processing unit when the computer is in the first status.

8. The method according to claim 7, wherein, the step of obtaining the input information comprises obtaining the input information inputted through the touch screen of the display apparatus of the computing apparatus.

9. The method according to claim 8, wherein, the step of updating the first display information in the display memory according to the input information comprises storing the input information at a location in the display memory corresponding to the location of the input information on the touch screen according to the definition of the display apparatus, and superimposing the input information and the original first display information in the display memory to obtain the second display information.

\* \* \* \* \*